(12) United States Patent
Shimizu

(10) Patent No.: US 7,111,870 B2
(45) Date of Patent: Sep. 26, 2006

(54) AIRBAG SYSTEM HAVING MULTIPLE COLLISION DETERMINING CIRCUITS

(75) Inventor: Nobuyoshi Shimizu, Okazaki (JP)

(73) Assignee: Denso Corporation, Kariya (JP)

( * ) Notice: Subject to any disclaimer, the term of this patent is extended or adjusted under 35 U.S.C. 154(b) by 274 days.

(21) Appl. No.: 10/795,428

(22) Filed: Mar. 9, 2004

(65) Prior Publication Data
US 2004/0183291 A1    Sep. 23, 2004

(30) Foreign Application Priority Data
Mar. 20, 2003   (JP)   ............................... 2003-077348

(51) Int. Cl.
*B60R 21/16*   (2006.01)
(52) U.S. Cl. ...................... 280/735; 180/282; 180/274; 701/45; 307/10.1
(58) Field of Classification Search ................ 280/735; 701/45; 307/10.1; 180/282, 274
See application file for complete search history.

(56) References Cited

U.S. PATENT DOCUMENTS

| | | | |
|---|---|---|---|
| 5,083,276 A * | 1/1992 | Okano et al. ................. 701/46 |
| 5,182,459 A | 1/1993 | Okano et al. | |
| 5,390,951 A * | 2/1995 | Iyoda ....................... 280/730.2 |
| 5,657,831 A | 8/1997 | Furui | |
| 5,865,463 A * | 2/1999 | Gagnon et al. ............. 280/735 |
| 5,916,290 A * | 6/1999 | Kiribayashi ................... 701/45 |
| 6,249,730 B1 * | 6/2001 | Khairallah et al. ........... 701/45 |
| 2001/0006309 A1 * | 7/2001 | Ueno et al. ................. 307/10.1 |
| 2001/0009337 A1 * | 7/2001 | Ueno et al. ................. 307/10.1 |
| 2004/0160045 A1 * | 8/2004 | Miura ........................ 280/735 |

FOREIGN PATENT DOCUMENTS

| JP | A-4-176758 | 6/1992 |
|---|---|---|
| JP | A-10-59116 | 3/1998 |
| JP | A-2003-252168 | 9/2003 |

* cited by examiner

*Primary Examiner*—Ruth Ilan
*Assistant Examiner*—Tiffany L. Webb
(74) *Attorney, Agent, or Firm*—Posz Law Group, PLC

(57) ABSTRACT

An airbag system comprises an airbag, an inflator, a squib, a high-side switch, a low-side switch, a firing circuit for switching the two switches, a first motion detecting circuit including an acceleration sensor, a second motion detecting circuit including an acceleration sensor, a first collision determining circuit for outputting a firing signal to the firing circuit, and a second collision determining circuit for outputting a firing signal to the firing circuit. The first collision determining circuit comprises an analog comparator for comparing a signal from the first motion detecting circuit with a reference value.

11 Claims, 5 Drawing Sheets

AIRBAG SYSTEM HAVING MULTIPLE COLLISION DETERMINING CIRCUITS

CROSS REFERENCE TO RELATED APPLICATION

This application is based on and incorporates herein by reference Japanese Patent Application No. 2003-77348 filed on Mar. 20, 2003.

FIELD OF THE INVENTION

The present invention relates to an airbag system having simple or low-cost collision determining circuits.

BACKGROUND OF THE INVENTION

Recent cars have airbags that inflate to protect drivers or passengers in emergency. However, accidental inflation of the airbag may damage drivers or passengers. In order to prevent such erroneous inflation, the conventional airbag system includes multiple systems for determining when a car collision occurs. The multiple systems includes at least two system, that is, a main system and a safing (fail-safe) system.

Some safing systems carry out mechanical processing from sensing to switching of inflator firing circuits. In view of recent demands for lighter weight and smaller size, however, many safing systems carry out electric processing as main systems do. FIGS. 9 and 10 show the circuitry of such airbag systems S of cars. The main and safing systems of both airbag systems S carry out electric processing.

In FIG. 9, the airbag system S includes acceleration sensors 71 and 72, a firing circuit 2 and an airbag 9. The firing circuit 2 includes a high-side switch 21, a low-side switch 22 and a squib 8. Determining circuits 61 and 62 consist of A/D converters 611 and 621, microcomputers 612 and 622, and signal output circuits 613 and 623, respectively. The signals output from the acceleration sensors 71 and 72 are converted into digital signals by the A/D converters 611 and 621. The microcomputers 612 and 622 process the digital signals to determine whether the car has collided or not. When the car collides, the output circuits 613 and 623 output firing signals to turn on the high-side switch 21 and low-side switch 22, respectively, in the firing circuit 2. This causes a firing current to flow through the squib 8, firing the inflator to inflate the airbag 9. The circuitry shown in FIG. 10 is similar to FIG. 9.

In the airbag systems shown in FIG. 9, the collision determining circuits 61 and 62 of the main and sating systems are provided independently of each other, that is, built into separate electronic circuit substrates, so that the system S is more reliable. However, the independent circuit substrates require a larger area, so that the electronic control units of the system are larger in size, and they make it more difficult to reduce costs.

In the airbag system S shown in FIG. 10, the collision determining circuits for the main and safing systems are built into one electronic circuit substrate 61a in common, so that it is easier for the system S to be smaller in size and less costly. However, the common unit makes the main and safing systems more liable to fail at the same time, so that the airbag system S is less reliable.

SUMMARY OF THE INVENTION

In view of the foregoing circumstances, it is an object of the present invention to provide an airbag system having reliable collision determining circuits that are smaller in size and less costly than those of the conventional airbag systems.

An airbag system according to the present invention for a car includes an electronic control unit having two collision determining circuits that are independent of each other so that the system can be reliable. One of the collision determining circuits is simplified so that the airbag system can be smaller in size and less costly.

The simplified collision determining circuit comprises a comparator and does not include an A/D converter, a microcomputer, etc. The comparator compares a signal from a motion detecting circuit with a reference value to determine whether the car has collided or not.

This enables the electronic control unit for the airbag system to be smaller in size and less costly than the conventional systems. The simplified circuit does not reduce the system reliability because the two collision determining circuits are provided to be independent of each other. The comparator as one of the collision determining circuits has lower degrees of freedom of tuning etc. However, the other collision determining circuit is sufficient for required collision determination for the particular car, for example.

Consequently, the circuitry of the airbag system can be simpler, and it is easy to make the circuitry smaller in size and less costly. When the comparator is combined with a firing circuit or another circuit, the wiring between them is needless or shortened, so that it is inhibited from picking up noise and/or other disturbance. This makes the airbag system more reliable. Herein, "combining" means combining or integrating two or more circuits having different functions, and does not necessarily mean integrating them into one IC. Of course, when the switch driving means of the firing circuit is a driving IC, it is more preferable that the first collision determining circuit be built into the driving IC.

Alternatively, the first collision determining circuit, which is independent of the second collision determining circuit, is combined with the firing circuit. This maintains the reliability of the airbag system and makes the electronic control unit smaller in size and less costly. The first collision determining circuit includes an A/D converter, a determination operating circuit and a signal outputting circuit. Consequently, the first collision determining circuit as well can carry out the tuning etc. of the particular car. This increases the degree of design freedom.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
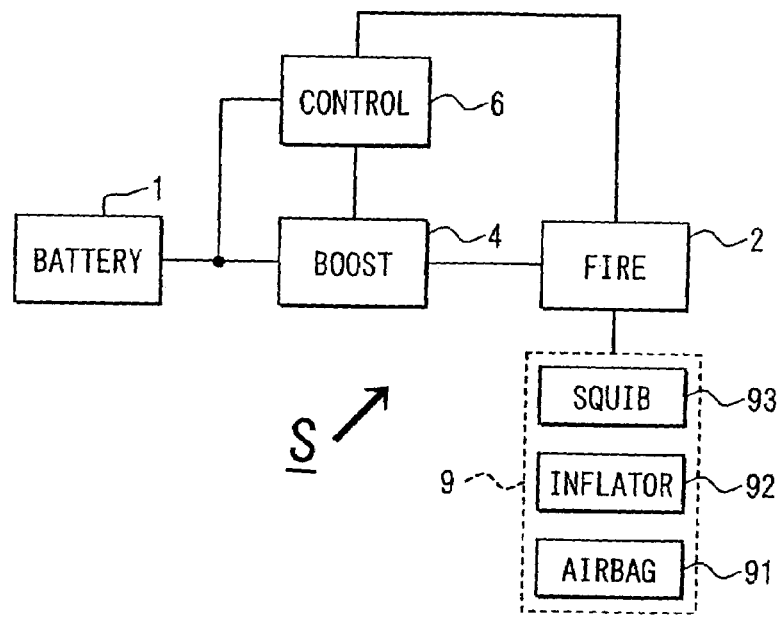
FIG. 1 is a block diagram of an airbag system according to a first embodiment of the present invention.

The present invention will be described in detail with reference to various embodiments shown in the accompanying drawings. The same and/or similar components in the following embodiments are denoted with the same reference numerals.

FIRST EMBODIMENT

Referring first to FIG. 1, an airbag system S for a car has a car battery 1, a controlling circuit 6, a boosting circuit 4, a firing circuit 2, a squib 93, an inflator 92, and airbag 91. The controlling circuit 6 controls the firing circuit 2 and boosting circuit 4. The battery 1 supplies power to the boosting circuit 4, which generates high voltage. The high voltage is applied to the firing circuit 2, which supplies firing current to the squib 93 when the car collides. The squib 93 fires the inflator 92, which produces gas for inflating the airbag 91. The airbag 91 inflates with the gas.

The airbag 91, inflator 92 and squib 93 may be built into a steering wheel 9 of a car. The firing circuit 2, boosting circuit 4 and controlling circuit 6 are incorporated into an electronic control unit for the airbag system S. The boosting circuit 4 etc. are well known.

Figure 2:
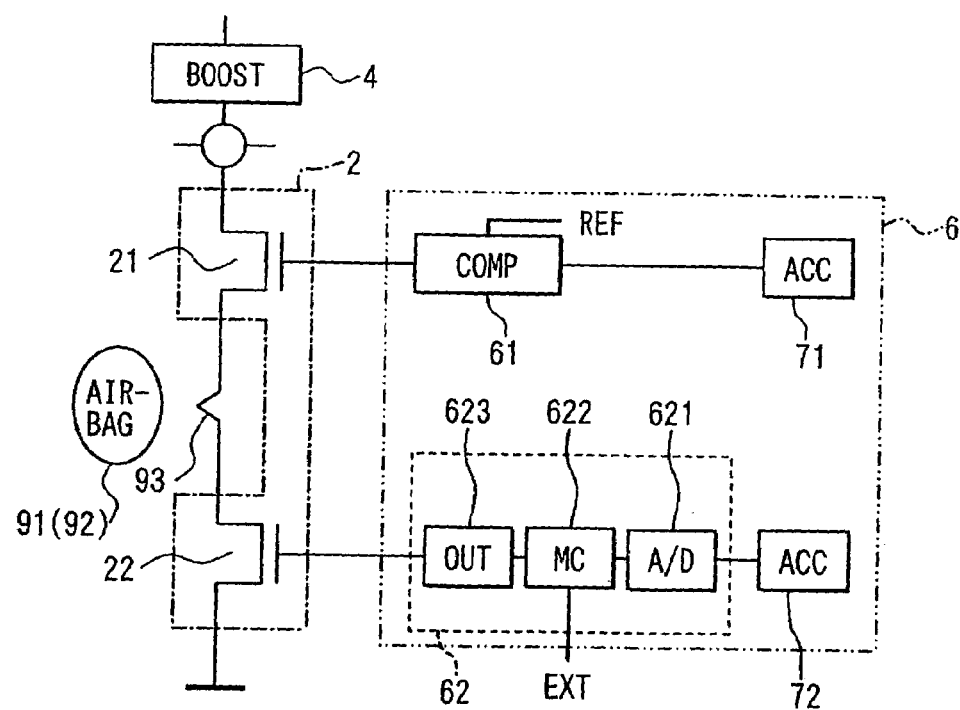
FIG. 2 is a detailed circuit diagarm of an airbag system according to the first embodiment.

As shown in FIG. 2, the firing circuit 2 consists essentially of a high-side (high-voltage side) switch 21 and a low-side (low-voltage side) switch 22 for switching the firing current, which is supplied to the squib 93. The firing circuit 2 includes a switch driving circuit, which is not shown, for driving the switches 21 and 22.

The controlling circuit 6 includes a safing collision determining circuit 61 and a main collision determining circuit 62, which control the driving of the firing circuit 2. The controlling circuit 6 also includes a first motion detecting circuit 71 and a second motion detecting circuit 72, which comprise a first acceleration sensor (a first motion sensor) and a second acceleration sensor (a second motion sensor), respectively.

The safing collision determining circuit 61 is an analog comparator to which a reference voltage REF is applied from a reference voltage source, which may be a voltage dividing resistor circuit. The first motion detecting circuit 71 outputs an analog signal, which is compared with the reference voltage by the comparator. This determining circuit 61 outputs low or high voltage, according to which the switch driving circuit of the firing circuit 2 turns on the high-side switch 21. The safing collision determining circuit 61 compensates (fail-safes) the main collision determining circuit 62.

The main collision determining circuit 62 is independent of the safing collision determining circuit 61 and consists of an A/D converter 621, a microcomputer 622 and a signal output circuit 623. The second motion detecting circuit 72 outputs an analog signal, which is converted into a digital signal by the A/D converter 621. The digital signal is input to the microcomputer 622. On the basis of the digital signal, the microcomputer 622 determines whether to inflate the airbag 91 or not. When the microcomputer 622 determines that the car has had such a collision that the airbag 91 should be inflated, the output circuit 623 outputs a firing signal to the switch driving circuit of the firing circuit 2, turning on the low-side switch 22.

For more advanced and accurate determination, the microcomputer 622 also bases the determination on an external signal EXT in addition to the signal from the second motion detecting circuit 72. The main collision determining circuit 62 carries out collision determination according to the program stored in the microcomputer 622. Accordingly, by changing the program, it is possible to easily change the setting of the system from car to car.

When the two collision determining circuits 61 and 62 cause both switches 21 and 22 of the firing circuit 2 to be turned on, a firing current flows through the squib 93 of this circuit. The firing current fires the inflator 92, inflating the airbag 91.

SECOND EMBODIMENT

In the first embodiment, the safing collision determining circuit 61 and main collision determining circuit 62 are provided independently in one electronic control unit.

Figure 3:
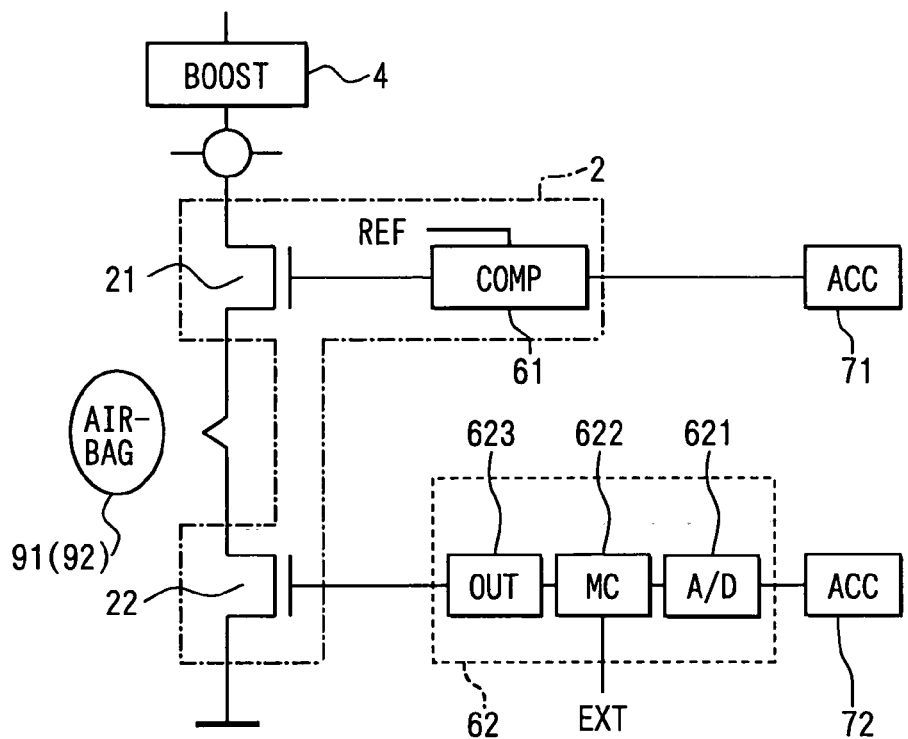
FIG. 3 is a detailed circuit diagram of an airbag system according to a second embodiment of the present invention.

In the second embodiment shown in FIG. 3, however, the safing collision determining circuit 61 is incorporated into the firing circuit 2. Because this determining circuit 61 is a simple circuit comprising an analog comparator, it is easy to incorporate the circuit 61 into the firing circuit 2. The incorporation greatly reduces the possibility that the communication path from the determining circuit 61 to the firing circuit 2 will pick up noise and/or the like. This makes the airbag system S more reliable. When the switch driving circuit of the firing circuit 2 and the safing collision determining circuit 61 are incorporated into one driving IC, the electronic control unit can be smaller in size and less costly.

THIRD EMBODIMENT

Figure 4:
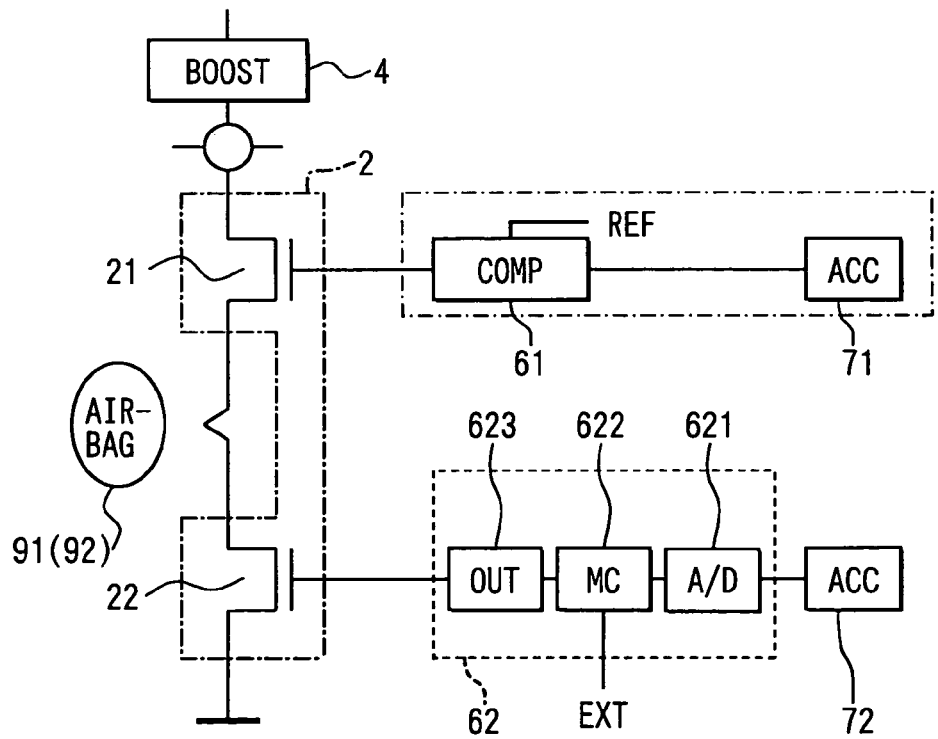
FIG. 4 is a detailed circuit diagram of an airbag system according to a third embodiment of the present invention.

In the third embodiment, shown in FIG. 4, in contrast to the second embodiment, the safing collision determining circuit 61 and first motion detecting circuit 71 are provided in one unit. Because this determining circuit 61 is a simple circuit comprising a comparator, it is easy to incorporate the circuit 61 into the detecting circuit 71. The incorporation greatly reduces the possibility that the communication path from the detecting circuit 71 to the determining circuit 61 will pick up noise and/or the like. This makes the airbag system S more reliable.

FOURTH EMBODIMENT

Figure 5:
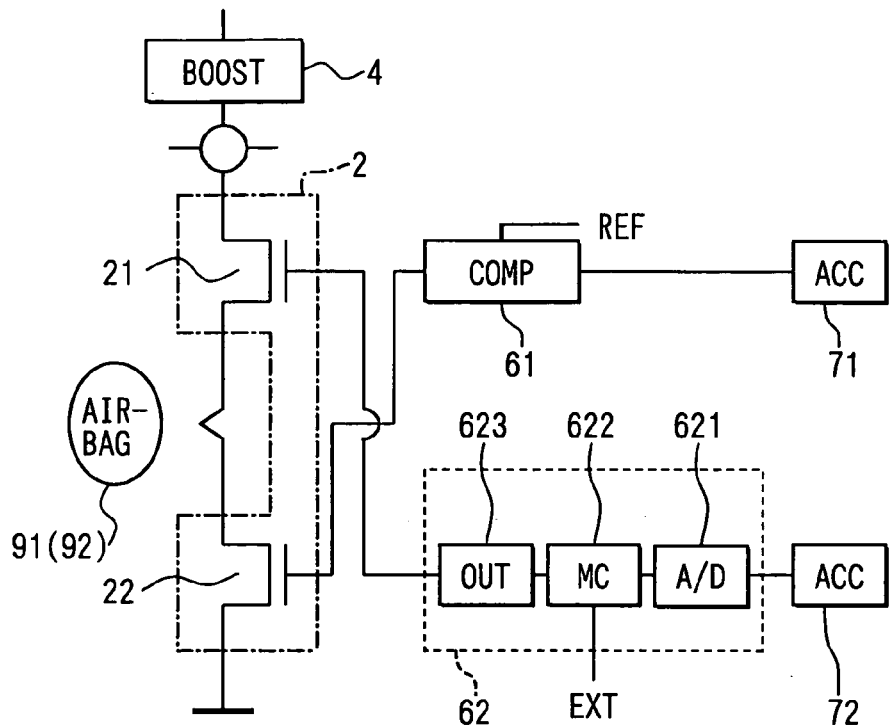
FIG. 5 is a detailed circuit diagram of an airbag system according to a fourth embodiment of the present invention.

In the fourth embodiment shown in FIG. 5, the safing collision determining circuit 61 and main collision determining circuit 62 are associated with the low-side switch 22 and high-side switch 21, respectively.

When the firing circuit 2 or another circuit fails by short-circuiting, short-circuiting to the ground occurs more possibly than short-circuiting to the positive power supply. The safing collision determining circuit 61 is designed to detect a collision impact weaker than that which the main collision determining circuit 62 is designed to detect. Accordingly, the association of the determining circuits 61 and 62 with the switches 22 and 21, respectively, as shown in FIG. 5 prevents the airbag 91 from inflating accidentally when the short-circuiting to the ground occurs.

FIFTH EMBODIMENT

In the first embodiment, the safing collision determining circuit 61 and main collision determining circuit 62 are connected directly with the high-side switch 21 and low-side switch 22, respectively.

Figure 6:
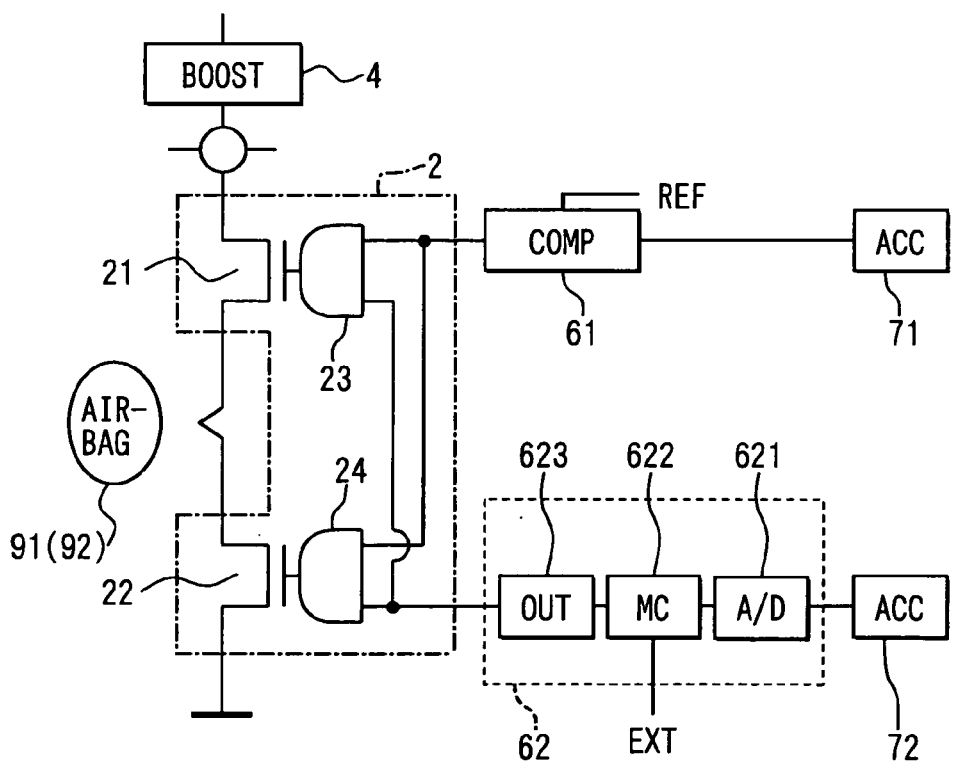
FIG. 6 is a detailed circuit diagram of an airbag system according to a fifth embodiment of the present invention.

In the fifth embodiment shown in FIG. 6, however, the switch driving circuit of the firing circuit 2 includes AND circuits 23 and 24 in place of the direct connection. In this case, when the outputs from the two determining circuits 61 and 62 are not high at the same time, neither of the switches 21 and 22 is turned on, so that the airbag 91 does not inflate.

The comparison between the first and fifth embodiments reveals that the airbag systems S operate equally as far as the circuits are normal. In the first embodiment, however, when the low-side switch 22 fails with a short-circuiting to the ground, the inflation of the airbag 91 is determined from the outputs from the first motion detecting circuit 71 and safing collision determining circuit 61, independently of the outputs from the second motion detecting circuit 72 and main collision determining circuit 62.

In the fifth embodiment, even in such a case, the outputs from the two detecting circuits 71 and 72 and the two determining circuits 61 and 62 are reflected in the determination of whether to turn on or off the high-side switch 21, which is involved directly with the inflation of the airbag 91. This makes the airbag systems S more reliable.

SIXTH EMBODIMENT

Figure 7:
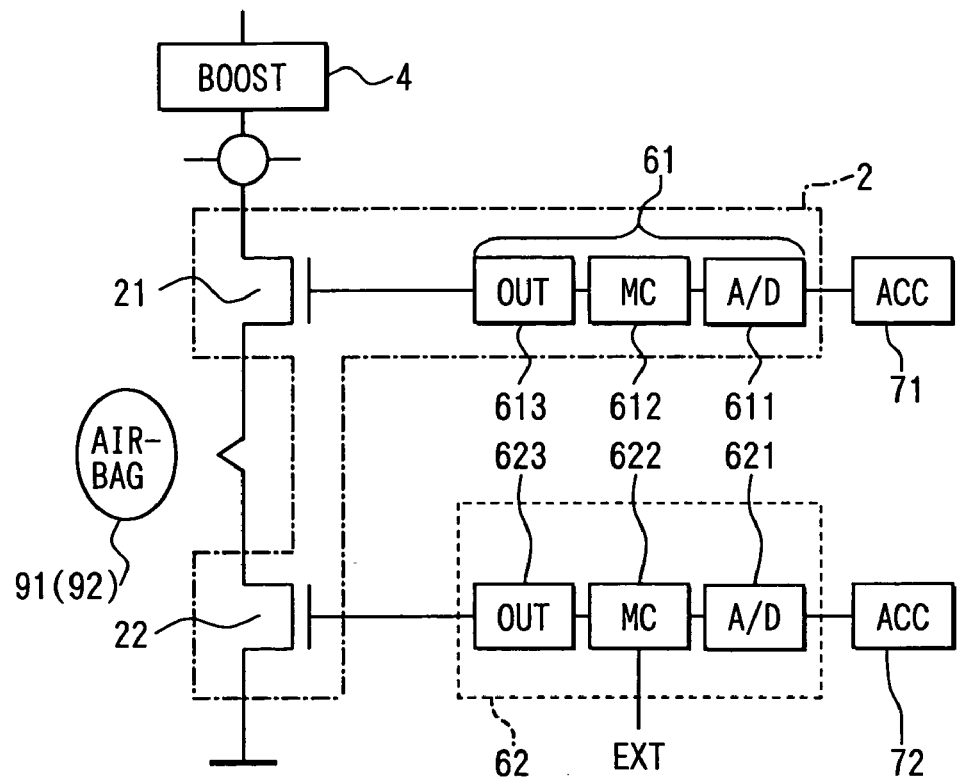
FIG. 7 is a detailed circuit diagram of an airbag system according to a sixth embodiment of the present invention.

In the sixth embodiment shown in FIG. 7, the safing collision determining circuit 61 consists of an A/D converter 611, a microcomputer 612 as a determination operating circuit and a signal output circuit 613, as is the case with the main collision determining circuit 62. The two determining circuits 61 and 62 are independent of each other. The safing collision determining circuit 61 and firing circuit 2 are provided in one unit. Consequently, the degree of tuning freedom in the safing collision determining circuit 61 can be equivalent to the degree of freedom of the main collision determining circuit 62.

The switch driving circuit of the firing circuit 2 and the A/D converter 611, microcomputer 612 and signal output circuit 613 are incorporated into a driving IC unit. The incorporation inhibits communication paths from picking up noise and/or the like. This makes the airbag system S more reliable.

SEVENTH EMBODIMENT

In each of the foregoing embodiments, the motion detecting circuits 71 and 72 comprise acceleration sensors, which output analog electric signals (voltage) according to the car motion (acceleration) at all times to the comparator, etc.

Figure 8:
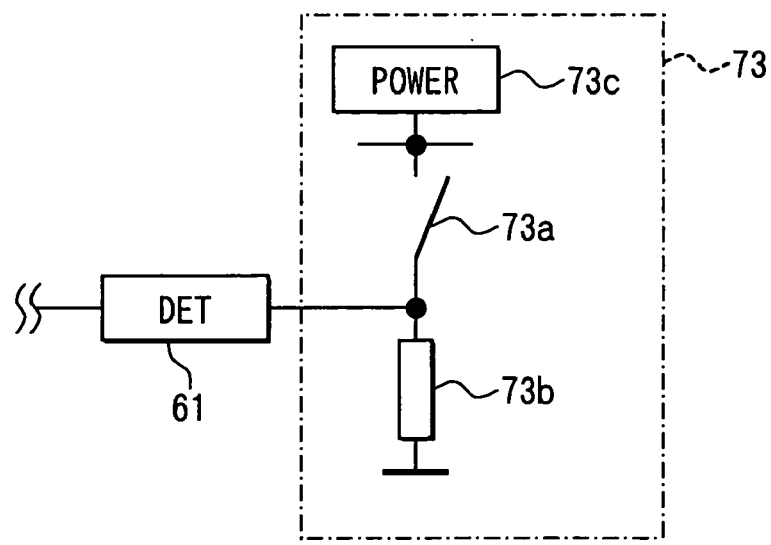
FIG. 8 is a detailed circuit diagram of an airbag system according to a seventh embodiment of the present invention.
Figure 9:
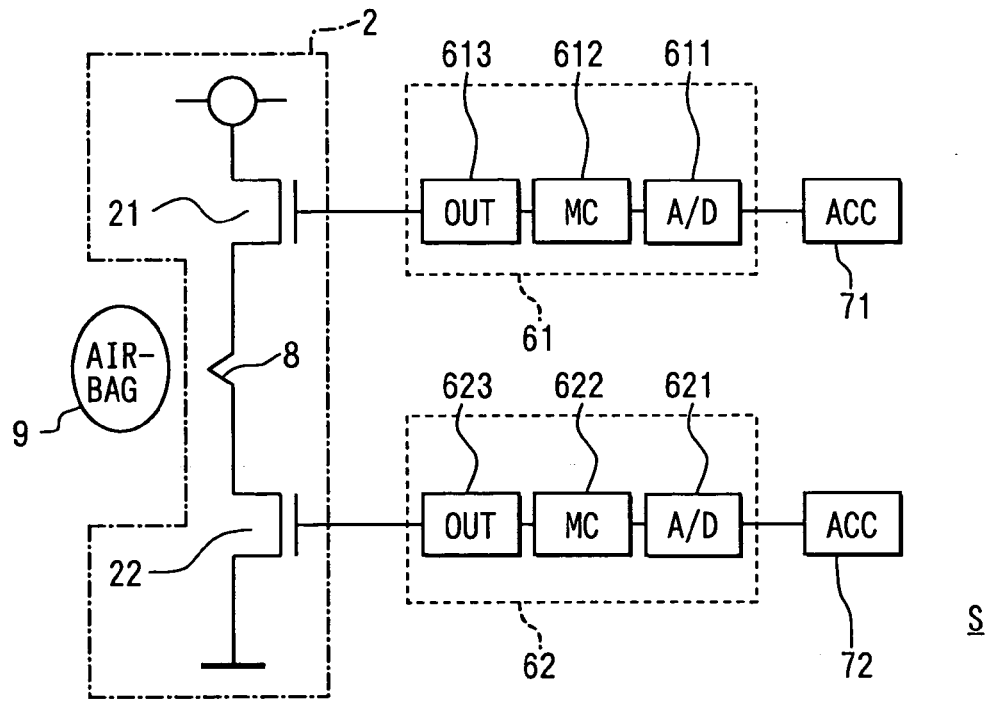
FIG. 9 is a detailed circuit diagram of a conventional airbag system.
Figure 10:
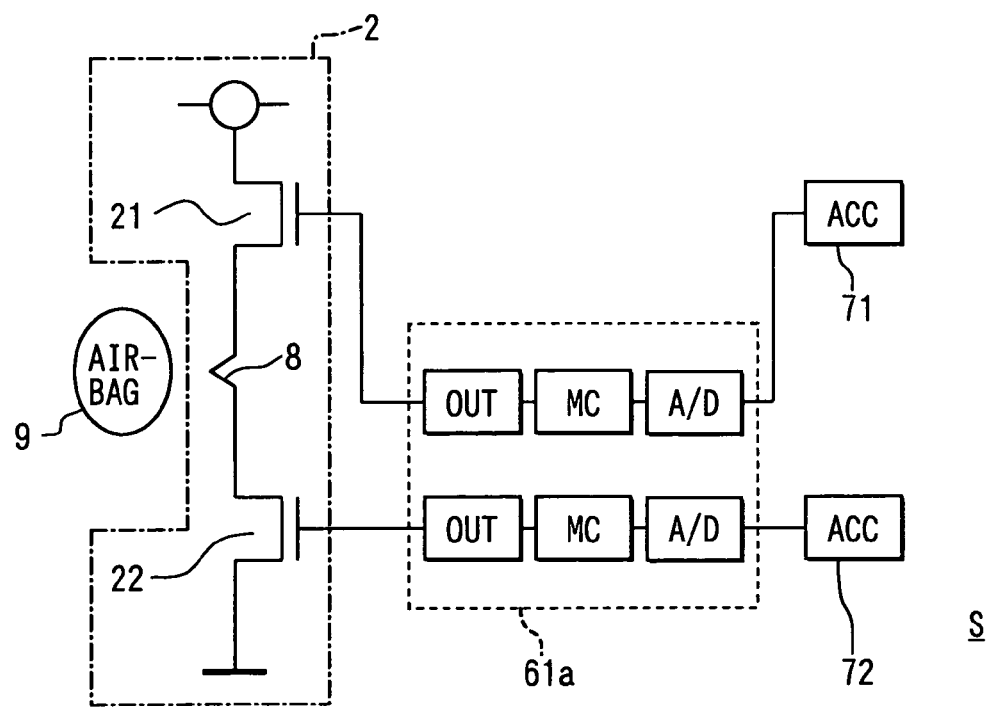
FIG. 10 is a detailed circuit diagram of another conventional airbag system.

Essentially, however, the required function of the motion detecting circuits 71 and 72 is to detect whether the car has had such a collision that the airbag 91 should inflate. Accordingly, the detecting circuits 71 and 72 might output signals to the comparator etc. only when such a collision has occurred. FIG. 8 schematically shows such a motion detecting circuit 73, which consists of a mechanical switch 73a, a resistor 73b and a power supply 73c. One terminal of the mechanical switch 73a is connected in series with the resistor 73b. The other terminal of the mechanical switch 73a is connected with the power supply 73c. A midpoint between the mechanical switch 73a and resistor 73b may be connected with a safing collision determining circuit 61. When the car acceleration exceeds a set value, the mechanical switch 73a is turned on so that the terminal voltage of the resistor 73b may be output to the determining circuit 61.

This motion detecting circuit 73 might replace one or each of the motion detecting circuits 71 and 72. For example, the detecting circuit 73 might replace only the detecting circuit 71, which is connected with the safing collision determining circuit 61.

The present invention should not be limited to the disclosed embdodiments, but may be modified in many other ways without departing from the spirit of the invention. For instance, more than two acceleration sensors, collision determining circuits and switches may be provided for actuating one airbag.

What is claimed is:

1. An airbag system for a car comprising:
    airbag inflatable with gas;
    an inflator for producing gas for the airbag;
    a squib for firing the inflator;
    a firing circuit including a high-side switch and a low-side switch for allowing a firing current to flow or preventing the current from flowing through the squib, on the high-voltage and low-voltage sides, respectively, of the squib;
    the firing circuit further including a switch driving means for switching the two switches;
    a first motion detecting circuit including a first motion sensor for outputting an electric signal representing a motion of the car;
    a second motion detecting circuit including a second motion sensor for outputting an electric signal representing a motion of the car;
    a first collision determining circuit; and
    a second collision determining circuit independent of the first collision determining circuit;
    the first and the second collision determining circuits being adapted to determine on the basis of the electric signals from the first and the second motion detecting circuits, respectively, whether the car has collided or not;
    the two collision determining circuits being further adapted to output firing signals to the switch driving means of the firing circuit when the car collides,
    wherein the airbag is inflated when the car collides,
    the first collision determining circuit comprising a comparator for comparing the electric signal from the first motion detecting circuit with a reference value.

2. The airbag system according to claim 1,
    wherein the second collision determining circuit is a main collision determining circuit for determining whether the car has collided or not, on the basis of the electric signal from the second motion detecting circuit and an external signal received from a circuit other than the second motion detecting circuit and representing the motion of the car, and
    wherein the first collision determining circuit is a safing collision determining circuit for compensating the main collision determining circuit without receiving external signals from circuits other than the first motion detecting circuit.

3. The airbag system according to claim 1,
    wherein the first collision determining circuit is combined with the firing circuit or the first motion detecting circuit.

4. The airbag system according to claim 3,
   wherein the switch driving means of the firing circuit is a driving IC, and
   wherein the first collision determining circuit is built into the driving IC.

5. An airbag system for a car comprising:
   an inflatable airbag;
   a firing circuit including a plurality of switches for inflating the airbag when actuated concurrently; and
   a plurality of accelecration sensors for producing output signals respectively corresponding to impacts applied thereto;
   a plurality of collision determining circuit means for actuating the switches, respectively, in response to the output signals of the corresponding accelecration sensors,
   wherein the plurality of collision determining circuit means includes at least a digital circuit means and an analog circuit means, the digital circuit means including an A/D converter and a microcomputer, and the analog circuit means including an analog voltage comparator.

6. The airbag system according to claim 5,
   wherein the analog circuit means is connected to actuate one of the switches in response to an impact lower than that in response to which the digital circuit means actuates another of the switches.

7. The airbag system according to claim 5,
   wherein the plurality of switches are provided in a single unit, and
   wherein only the analog circuit means is provided within the single unit of the plurality of switches.

8. The airbag system according to claim 5,
   wherein the analog circuit means and one of the plurality of acceleration sensors corresponding to the analog circuit means are provided in a single unit separately from other of the plurality of acceleration sensors and the digital circuit means.

9. The airbag system according to claim 5,
   wherein the analog circuit means is connected to actuate one of the plurality of switches, which is connected to a ground, and
   wherein the digital circuit means is connected to actuate another one of the plurality of switches, which is connected to a power supply side.

10. The airbag system according to claim 9,
    wherein the analog circuit means is connected to actuate the one of the switches in response to an impact lower than that in response to which the digital circuit means actuates the another one of the plurality of switches.

11. The airbag system according to claim 5, further comprising:
    a plurality of AND gates connected between the plurality of switches and the plurality of collision determining circuit means, respectively,
    wherein each of the AND gates are connected to both the analog circuit means and the digital circuit means.

* * * * *